United States Patent [19]

Hilfman

[11] Patent Number: 4,632,749
[45] Date of Patent: Dec. 30, 1986

[54] FLUID CATALYTIC CRACKING HYDROCARBON CONVERSION PROCESS

[75] Inventor: Lee Hilfman, Mt. Prospect, Ill.

[73] Assignee: UOP Inc., Des Plaines, Ill.

[21] Appl. No.: 648,432

[22] Filed: Sep. 7, 1984

Related U.S. Application Data

[63] Continuation-in-part of Ser. No. 474,998, Mar. 14, 1983, abandoned.

[51] Int. Cl.$^4$ .............................................. C10G 11/05
[52] U.S. Cl. ...................................... 208/120; 502/65; 502/79
[58] Field of Search ...................... 208/120; 502/65, 79

[56] References Cited

U.S. PATENT DOCUMENTS

| 3,531,397 | 9/1970 | Michalko | 208/120 |
| 4,093,560 | 6/1978 | Kerr et al. | 208/120 |
| 4,259,212 | 3/1981 | Gladrow et al. | 502/65 |
| 4,401,556 | 8/1983 | Bezman et al. | 208/111 |

FOREIGN PATENT DOCUMENTS 1131195 9/1982 Canada .

Primary Examiner—D. E. Gantz
Assistant Examiner—O. Chaudhuri
Attorney, Agent, or Firm—Thomas K. McBride; William H. Page, II; John G. Cutts, Jr.

[57] ABSTRACT

A process is disclosed for the fluid catalytic cracking of a hydrocarbon oil which comprises contacting said oil at fluid catalytic cracking conditions with a catalyst consisting of silica, a rare earth metal component and a dealuminated zeolitic aluminosilicate having a $SiO_2/Al_2O_3$ molar ratio of from 4.5 to 35, the essential X-ray powder diffraction pattern of zeolite Y, an ion exchange capacity of not greater than 0.070, a unit cell dimension $a_o$ of from 24.20 to 24.45 Å, a surface area of at least 350 m$^2$/g (B-E-T), a sorptive capacity for water vapor at 25° C. and a $p/p_o$ value of 0.10 of less than 4.00 weight percent and a Residual Butanol Test value of not more than 0.40 weight percent.

5 Claims, No Drawings

4,632,749

FLUID CATALYTIC CRACKING HYDROCARBON CONVERSION PROCESS

CROSS-REFERENCE TO RELATED APPLICATION

This application is a continuation-in-part of my co-pending application Ser. No. 474,998 filed Mar. 14, 1981, the teachings of which application are incorporated herein by specific reference thereto.

BACKGROUND OF THE INVENTION

The field of art to which this invention pertains is fluid catalytic cracking of hydrocarbon feedstocks. It relates to a fluid catalytic cracking process which utilizes a catalyst consisting essentially of silica, a rare earth metal component and a dealuminated zeolitic aluminosilicate having a $SiO_2/Al_2O_3$ molar ratio of from 4.5 to 35, the essential X-ray powder diffraction pattern of zeolite Y, an ion exchange capacity of not greater than 0.070, a unit cell dimension a of from 24.20 to 24.45 A, a surface area of at least 350 m²/g (B-E-T), a sorptive capacity for water vapor at 25° C. and a $p/p_o$ value of 0.10 of less than 4.00 weight percent and a Residual Butanol Test value of not more than 0.40 weight percent.

INFORMATION DISCLOSURE

In the field of hydrocarbon conversion catalysts, amorphous silica-alumina has been a pioneer material both as a catalyst and as a carrier material for other catalytic components. After the discovery of amorphous silica-alumina catalysts, crystalline aluminosilicates or zeolites were discovered to have significant catalytic properties which overshadowed the catalytic properties of the amorphous forms. The zeolite catalysts were made from either natural or synthetic zeolites and have been developed for hydrocarbon hydroconversion for twenty years or more. Known zeolites include the natural zeolites faujasite, mordenite, erionite and chabazite and synthetic zeolites A, L, S, T, X and Y. In general, zeolites are metal aluminosilicates having a crystalline structure such that a relatively large adsorption area is present inside each crystal. Zeolites consist basically of three-dimensional frameworks of $SiO_4$ and $AlO_4$ tetrahedra with the tetrahedra cross-linked by the sharing of oxygen atoms. The electrovalence of the tetrahedra containing aluminum is balanced by the inclusion of cations in the crystal, for example, metal ions, ammonium ions, amine complexes or hydrogen ions. The spaces in the pores may be occupied by water or other adsorbate molecules. Normally, the crystalline zeolites occur, or are prepared, in the sodium or potassium form.

The prior art catalysts have suffered from the disadvantage of converting a certain amount of the hydrocarbon feedstock to coke which is deposited on the surface of the catalyst and elsewhere. When the accumulation of coke becomes too great thereby reducing the effectiveness of the catalyst, regeneration of the catalyst must be performed to restore the initial hydrocarbon conversion activity. Of course, the regeneration step is inherently non-productive and those skilled in the catalyst formulation art continually strive to develop new catalysts which demonstrate a resistance to coke-forming tendencies.

Canadian Pat. No. 1,131,195 (Earls), which is assigned to Union Carbide Corporation, claims a stabilized Y zeolite which is also referred to as ultrahydrophobic zeolite Y (UHP-Y). The stabilized Y zeolite claimed in the '195 patent is described as a highly thermally stable form of zeolite Y which exhibits to an unique degree an adsorptive preference for less polar organic molecules relative to strongly polar molecules such as water. The '195 patent teaches that UHP-Y zeolites can be characterized to distinguish them from all other zeolite forms as being zeolitic aluminosilicates having a $SiO_2/AL_2O_3$ molar ratio of from 4.5 to 35, preferably 4.5 to 9, the essential X-ray powder diffraction pattern of zeolite Y, an ion-exchange capacity of not greater than 0.070, a unit cell dimension of from 24.20 to 24.45 Angstroms, a surface area of at least 350 m²/g (B-E-T), a sorptive capacity for water vapor at 25° C. and a $p/p_o$ value of 0.10 of less than 5.00 weight percent, and a Residual Butanol Test value of not more than 0.40 weight percent. The '195 patent further teaches that UHP-Y compositions are especially suitable for use as adsorbents in applications where it is desired to preferentially adsorb organic constituents from solutions or mixtures thereof with water but does not mention any other utility or use. It is believed that the UHP-Y composition is sold by the Union Carbide Corporation under the trademark LINDE LZ-20.

U.S. Pat. No. 4,401,556 (Bezman et al.), which is assigned to Union Carbide Corporation, claims a middle distillate hydrocracking process using a catalyst comprising a hydrogenation component and UHP-Y. The '556 patent teaches that the UHP-Y may be used in combination with relatively inert refractory diluents such as alumina, silica, magnesia, zirconia, beryllia, titania and mixtures thereof. The hydrocracking process claimed in the '556 patent is limited to hydrocracking conditions which include the addition of hydrogen to the reaction zone. The essence of the invention in the '556 patent is the discovery that a catalyst comprising UHP-Y displays a high selectivity for the production of middle distillate hydrocarbon from high boiling petroleum feedstocks in a hydrocracking process. According to the '556 patent, hydrocracking is generally conducted at a reaction pressure in excess of 200 psig and usually within the range of about 500 to about 3000 psig.

U.S. Pat. No. 4,259,212 (Gladrow et al.) claims a cracking catalyst comprising discrete particles of ultra-stable Y zeolite and discrete particles of alumina, which particles are dispersed in a porous oxide matrix to produce a catalyst containing 5–40 wt. % ultra-stable Y zeolite, 5–40 wt. % alumina and 40–90 wt. % of porous oxide matrix. The '212 patent characterizes "ultra-stable" Y zeolite as having an alkali metal oxide content of less than about 4 wt. %, a unit cell size of less than about 24.50 Angstroms and a silica/alumina mol ratio in the range of 3.5–7 or higher. In accordance with Example 1 of the '212 patent, Linde LZ-Y82 is considered to fall within the definition of "ultra-stable" as used therein but, as used in Example 4, the Linde LZ-Y52 (sodium Y faujasite) had a high soda content (at least 5.7 wt. %) and therefore was considered to be outside the scope of the "ultra-stable" definition. Linde LZ-Y52 is well known to be a significantly less desirable component in a cracking catalyst as indicated in the '212 patent at column 14, lines 49–53. The '212 patent broadly teaches methods by which the ultra-stable form of the Y zeolite may be prepared at column 3, line 50 to column 4, line 8. These methods generally will produce the exemplified Linde LZ-Y82 ultra-stable form of the Y zeolite.

Certain of these methods and conditions may unwittingly produce UHP-Y. However, these methods will not necessarily produce the dealuminated stabilized Y zeolite (UHP-Y) which is hereinabove described in Canadian Pat. No. 1,131,195 and which is sold under the trademark LINDE LZ-20.

U.S. Pat. No. 3,531,397 (Michalko) teaches that crystalline aluminosilicates in general may be dispersed in a silica matrix and that the resulting catalysts may be used for hydrocarbon conversion. This patent, however, does not teach or exemplify the incorporation of a dealuminated stabilized Y zeolite, as defined in my invention, in a silica matrix.

It has now been discovered that a fluid catalytic cracking process utilizing a catalyst consisting essentially of silica, a rare earth metal component and a dealuminated zeolitic aluminosilicate having a $SiO_2/Al_2O_3$ molar ratio of from 4.5 to 35, the essential X-ray powder diffraction pattern of zeolite Y, an ion exchange capacity of not greater than 0.070, a unit cell dimension $a_o$ of from 24.20 to 24.45 Å, a surface area of at least 350 m$^2$/g (B-E-T), a sorptive capacity for water vapor at 25° C. and a $p/p_o$ value of 0.10 of less than 4.00 weight percent and a Residual Butanol Test value of not more than 0.40 wt. % demonstrates excellent conversion capability while yielding significantly lower coke yields. Hereinafter, the zeolitic aluminosilicate utilized in the present invention will be referred to as a "dealuminated stabilized Y zeolite."

BRIEF SUMMARY OF THE INVENTION

The present invention is, in one embodiment, a process for fluid catalytic cracking of a hydrocarbon oil which comprises contacting the oil at fluid catalytic cracking conditions with a catalyst consisting essentially of silica, a rare earth metal component and a dealuminated zeolitic aluminosilicate having a $SiO_2/Al_2O_3$ molar ratio of from 4.5 to 35, the essential X-ray powder diffraction pattern of zeolite Y, an ion exchange capacity of not greater than 0.070, a unit cell dimension $a_o$ of from 24.20 to 24.45 Å, a surface area of at least 350 m$^2$/g (B-E-T), a sorptive capacity for water vapor at 25° C. and a $p/p_o$ value of 0.10 of less than 4.00 weight percent and a Residual Butanol Test value of not more than 0.40 weight percent.

Other embodiments of the present invention encompass further details such as specific component concentrations of the catalytic composite, preferred methods of preparation, preferred feedstocks and hydrocarbon cracking conditions, all of which are hereinafter disclosed in the following discussion of each of these facets of the invention.

DETAILED DESCRIPTION OF THE INVENTION

The catalyst composite utilized in the present invention consists essentially of silica, a rare earth metal component and a dealuminated zeolitic aluminosilicate having a SiO2/Al2O3 molar ratio of from 4.5 to 35, the essential X-ray powder diffraction pattern of zeolite Y, an ion exchange capacity of not greater than 0.070, a unit cell dimension $a_o$ of from 24.20 to 24.45 Å, a surface area of at least 350 m$^2$/g (B-E-T), a sorptive capacity for water vapor at 25° C. and a $p/p_o$ value of 0.10 of less than 4.00 weight percent and a Residual Butanol Test value of not more than 0.40 weight percent. The rare earth metal component may be incorporated in any known convenient manner or otherwise.

Considering first the dealuminated stabilized Y zeolite from which the catalyst composite used in the present invention is made, this material is referred to herein as "dealuminated stabilized Y zeolite" and may be obtained from the Union Carbide Corporation which designates such material as "LZ-20". The "LZ-20" type of material is reported to be a distinct derivative of synthetic Y zeolite and demonstrates significantly improved catalytic properties. As mentioned hereinabove, crystalline aluminosilicates or zeolites, in general, are described as a three-dimensional network of fundamental structural units consisting of silicon-centered $SiO_4$ and aluminum-centered $AlO_4$ tetrahedra interconnected by a mutual sharing of apical oxygen atoms. The space between the tetrahedra is occupied by water molecules and subsequent dehydration or partial dehydration in a crystal structure interlaced with channels of molecular dimension.

The dealuminated stabilized Y zeolite as required by the present invention can be more particularly defined as an organophilic zeolitic aluminosilicate having a chemical SiO2/Al2O3 molar ratio of from 4.5 to 6, the essential X-ray powder diffraction pattern of zeolite Y, a BET surface area of at least 350 m$^2$/g and an adsorptive capacity for water vapor at 25° C. and a water vapor pressure of 2.4 Torr of from 6 to 12 wt. %. This may be compared to water adsorptive capacity for zeolite Y under similar conditions of from 20 to 25 wt. %.

Surface areas of LZ-20 are determined by the well known Brunauer-Emmett-Teller method (B-E-T) (S. Brunauer, P. Emmett and E. Teller, J. Am. Chem. Soc. 60, 309 [1938]) using nitrogen as the adsorbate.

The essential X-ray powder diffraction pattern of zeolite Y is set forth in U.S. Pat. No. 3,130,007, to Breck. It will be understood that the shrinkage of the unit cell resulting from the dealuminating stabilization process for converting zeolite Y to LZ-20 will cause some slight shift in the d-spacings. In all events, the X-ray diffraction pattern of the LZ-20 compositions will exhibit at least the d-spacings corresponding to the Miller Indices of Table A below, and can contain all the other d-spacings permissible to the face centered cubic system with a unit cell edge of 24.20 to 24.45 Angstroms. This may be compared to a unit cell edge of 24.7 Angstroms for Y-zeolite. The value of the d-spacings in Angstroms can be readily calculated by substitution in the formula:

$$d_{hkl} = \frac{a_o}{(h^2 + k^2 + l^2)^{\frac{1}{2}}}$$

where h, k and l are the Miller indices. The X-ray pattern of the LZ-20 is obtained by standard X-ray powder techniques. The radiation source is a high intensity, copper target, X-ray tube operated at 50 Kv and 40 ma. The diffraction pattern from the copper K radiation and graphite monochromator is suitably recorded by an X-ray spectrometer scintillation counter, pulse height analyzer and strip chart recorder. Flat compressed powder samples are scanned at 1° per minute, using a 2 second time constant. Interplanar spacings (d) are obtained from Bragg Angle (2 theta) positions of peaks after subtracting background. The crystal symmetry is cubic.

TABLE A

| Miller Indices (hkl) | Intensity |
| --- | --- |
| 111 | very strong |
| 220 | medium |
| 311 | medium |
| 331 | strong |
| 333; 511 | medium |
| 440 | medium |
| 533 | strong |
| 642 | strong |
| 751; 555 | strong |

The anhydrous state of any zeolite composition for purposes of determining constituent proportions in terms of weight percent is the condition of the zeolite after being fired in air at 1000° C. for one hour.

For the determination of the sorptive capacity of LZ-20 for any particular adsorbate, for example water, the test zeolite sample is activated by preheating at 425° C. for 16 hours at a pressure of 5 micrometers of mercury in a conventional McBain apparatus. Thereafter, the temperature of the sample is adjusted to the desired value and contacted with the vapor of the test adsorbate at the desired pressure.

According to my invention, the catalyst utilized in the instant fluid catalytic cracking process comprises a rare earth metal component. The rare earth metal component may be incorporated with the dealuminated stabilized Y zeolite either before or after the zeolite has been combined with the silica. Without wishing to be bound by any theory, it is believed that the rare earth metal component is primarily and intimately associated with the zeolite regardless of when the rare earth metal component is incorporated with the catalyst. One preferred method for incorporating the rare earth metal component is to exchange the dealuminated stabilized Y zeolite using a rare earth salt solution and then the exchanged zeolite is water washed, dried and calcined. A wide variety of rare earth compounds may be employed with facility as a source of rare earth metal ions. Suitable soluble compounds include rare earth chlorides, bromides, iodides, sulfates, acetates, benzoates, citrates, nitrates and the like. The preferred rare earth salts are the chlorides, nitrates and sulfates. The rare earth metal salts employed can either be the salt of single rare earth metal or, as is usually the case, mixtures of rare earth metals. Anions introduced to the zeolite as a consequence of the zeolite exchange treatment are suitably separated by water washing one or more times until free of the anions. In the event that the dealuminated stabilized Y zeolite is admixed with silica before the incorporation of the rare earth metal component, a similar rare earth metal exchange treatment of the admixture of silica and zeolite may be used. It is preferred that the rare earth metal component is present in an amount from about 1.0 wt. % to about 10 wt. % based on the metal exchanged zeolite. In a more preferred embodiment, the rare earth metal component is present in an amount from about 2 wt. % to about 5 wt. % based on the metal exchanged zeolite.

In accordance with my invention, the dealuminated stabilized Y zeolite may be composited with the silica in any convenient method known in the prior art. For example, one method for preparing the catalyst utilized in the instant invention is by admixing the finely divided dealuminated stabilized Y zeolite with finely divided silica and forming a desired catalyst shape. Another method, for example, for preparing the catalyst is by mixing the finely divided dealuminated stabilized Y zeolite into an aqueous colloidal dispersion of silica particles and drying and calcining the resulting admixture. Such aqueous colloidal dispersions of silica particles are commercially available on a large scale from the E. I. duPont deNemours & Company under the trade name Ludox Colloidal Silica, the Nalco Chemical Company under the trade name Nalcoag and others. In the event aqueous colloidal silica is selected as a precursor for the catalyst of the present invention, it is preferred that the sodium level be minimized for best results. Another method, for example, for preparing the catalyst is by mixing the finely divided dealuminated stabilized Y zeolite into a silica sol and drying and calcining the resulting admixture. The silica sol is available by conventional methods of preparation. Preferably, the silica sol is prepared by the acidification of an alkali metal silicate solution. The alkali metal silicate most often employed is an aqueous sodium silicate solution commercially available as "water glass." Acidification with a proper amount of acid such as hydrochloric acid, sulfuric acid, and the like, effects the hydrolysis of the water glass and the conversion thereof to a silicic acid or a silica sol. The water glass is usually diluted with water and added to the acid in the diluted state, the final pH preferably being at least about 2.5 and not in excess of about 4.5. To obviate polymerization and premature gelation thereof, the temperature is maintained below about 100° F. Because of the unique characteristics of the dealuminated stabilized Y zeolite, the introduction of the zeolite into an acidic aqueous environment is not significantly detrimental to the physical integrity of the zeolite and therefore, this is a preferred method of preparation. The earlier variations of Y zeolite were very susceptible to crystalline degradation in the presence of aqueous acid and therefore, the incorporation of the earlier variations of Y zeolite into an acidified water glass solution tended to reduce the quantity of crystalline aluminosilicate in the finished catalyst.

The catalyst composite utilized in the present invention preferably contains from about 5 wt. % to about 95 wt. % dealuminated stabilized Y zeolite. Regardless of the method of preparing the admixture of dealuminated stabilized Y zeolite and silica, the composition is preferably dried at a temperature from about 190° F. to about 500° F. or more for about 2 to about 24 hours or more and then calcined at a temperature from about 700° F. to about 1300° F. for about 0.5 to about 12 hours or more. It is preferred that preformed particles be dried slowly and also that the drying be effected in a humid atmosphere since it has been found to result in less breakage of discrete catalyst particles. However, in the event that the catalyst composite is prepared in a spray drier, the initial drying time is considerably shorter because of the inherently small particle size which is produced via this technique.

Suitable hydrocarbon feeds boil generally within the range from about 400° F. to about 1200° F. Such hydrocarbons may be derived, for example, from petroleum crude oil, shale oil and coal oil. Hydrocarbon feedstocks include light gas oils, heavy gas oils, vacuum gas oils, kerosenes, deasphalted oils and residual fractions. A preferred feedstock utilized with the present invention contains non-distillable hydrocarbons which are generally thought to be coke precursors under relatively high temperature conditions such as those encountered in catalytic cracking.

In accordance with the process of the present invention, the fluid catalytic cracking may be conducted in a manner having reaction conditions which include a pressure from about 5 psig to about 150 psig, a temperature from about 800° F. to about 1100° F., a catalyst to oil ratio from about 1 to about 10, a weight hourly space velocity from about 1 to about 50 and a residence time from about 0.5 second to about 1 minute or more.

The following examples are given to illustrate further the preparation of the catalytic composite utilized in the present invention and the use thereof in the conversion of hydrocarbons. These examples are not to be construed as an undue limitation on the generally broad scope of the invention as set in the appended claims and are therefore intended to be illustrative rather than restrictive.

EXAMPLE I

In accordance with the present invention, a commercially available aqueous colloidal silica having a low sodium content was selected as a component for the preparation of the catalyst utilized in the present invention. This colloidal silica was admixed with a sufficient quantity of finely divided dealuminated stabilized Y zeolite (LZ-20) to yield a finished catalyst containing 70 weight percent silica and 30 weight percent dealuminated stabilized Y zeolite. Prior to the admixture, the dealuminated stabilized Y zeolite was rare earth exchanged. The rare earth metal component was present in an amount of about 3.7 wt. % based on metal exchanged zeolite. The resulting admixture was dried at 215° F. for about 16 hours and then calcined at 1300° F. for about one hour. The resulting calcined catalyst was ground to yield particles which ranged in size from about −30 to about +100 mesh and steamed at 1425° F. for about 12 hours.

A first reference catalyst was prepared by admixing a finely divided, Y zeolite (Linde LZ-Y82) with a low sodium content colloidal silica, as mentioned above, and utilized in Example 1 of U.S. Pat. No. 4,259,212 (Gladrow et al.) to yield a finished catalyst containing 80 weight percent silica and 20 weight percent Y zeolite. Prior to the admixture, the Y zeolite was rare earth exchanged. The rare earth metal component was present in an amount of about 5 wt. % based on the metal exchanged zeolite. The resulting admixture was dried at 215° F. for about 16 hours and then calcined at 1300° F. for about one hour. The resulting calcined catalyst, hereinafter referred to as Reference Catalyst A, was ground to yield particles which ranged in size from about −30 to about +100 mesh and steamed at 1425° F. for about 12 hours.

A second reference catalyst, hereinafter referred to as Reference Catalyst B, was prepared by admixing a finely divided Y zeolite (Linde LZ-Y82) with a low sodium content colloidal silica as mentioned above to yield a finished catalyst containing 70 weight percent silica and 30 weight percent Y zeolite. Prior to the admixture, the Y zeolite was rare earth exchanged and contained about 5 wt. % rare earth metal component based on the metal exchanged zeolite. The resulting admixture was dried at 215° F. for about 16 hours and then calcined at 1300° F. for about one hour. The resulting calcined catalyst was ground to yield particles which ranged in size from about −30 to about +100 mesh and steamed at 1425° F. for about 12 hours.

Each of the hereinabove described catalysts was separately tested according to ASTM Method D 3907-80 which is also known as the Standard Method for Testing Fluid Cracking Catalysts by Microactivity Test or more simply known as the MAT test.

Reference Catalyst A was tested according to the standardized MAT test conditions and was found to convert 50 weight % of the gas oil feedstock to hydrocarbons boiling below 450° F. with a corresponding coke yield of 0.8 weight percent of the feedstock. Under the MAT test conditions, Reference Catalyst B was found to convert 70 weight % of the gas oil feedstock to hydrocarbons boiling below 450° F. with a corresponding coke yield of 1.4 weight percent of the feedstock. The catalyst of the present invention, under MAT test conditions, converted 59 weight % of the gas oil feedstock to hydrocarbons boiling below 450° F. with a corresponding coke yield of only 0.4 weight percent of the feedstock. The results of these tests are summarized in Table 1.

TABLE I
SUMMARY OF RESULTS

| Catalyst | Conversion. Weight Percent | Coke Yield, Weight Percent |
|---|---|---|
| A | 50 | 0.8 |
| B | 70 | 1.4 |
| Catalyst of the Present Invention | 59 | 0.4 |

This summary clearly demonstrates surprising and unexpected results caused by the incorporation of a dealuminated stabilized Y zeolite in a silica matrix. Even though the catalyst utilized in the process of the present invention with an initial dealuminated stabilized Y zeolite concentration of 30 weight percent demonstrated a conversion of 59 while Catalyst B which contained an initial Y zeolite concentration of 30 weight percent demonstrated a conversion of 70, the catalyst utilized in the process of the present invention only produced 28.5% of the coke produced by Catalyst B. When the catalyst utilized in the process of the present invention with an initial 30 weight % dealuminated stabilized Y zeolite and 59% conversion is compared with Catalyst A with an initial 20 weight percent Y zeolite and 50% conversion, the catalyst utilized in the process of the present invention only produced 50% of the coke produced by Catalyst A. Although the catalyst utilized in the process of the present invention appears to be slightly less active, this debit is more than overcome by the substantial reduction in coke yield. Coke yield is proportional to that portion of the feedstock which is consumed and will no longer be able to be recovered as a useful hydrocarbon component. Therefore, in order to obtain maximum hydrocarbon production, the coke yield must be minimized. In a fluid catalytic cracking process, any slight reduction in catalyst activity of a low-coke producing catalyst can be easily overcome by simply increasing the flow rate of the regenerated catalyst to the riser which acts as the hydrocarbon conversion zone. The foregoing analysis readily shows that the process of the present invention demonstrates a remarkable and unexpected ability for hydrocarbon conversion with exceedingly low coke production.

EXAMPLE II

This example is presented to further demonstrate the remarkably low coke make characteristics of the present invention. As discussed hereinabove, the advantage to be enjoyed by low coke make is the maximization of hydrocarbon products.

A sample of Catalyst B prepared as described in Example I was steaaed at 1450° F. for 12 hours after calcination and subsequently tested in a MAT-type test procedure to convert 65 weight percent of the gas oil feedstock to hydrocarbons boiling below 450° F. with a corresponding coke yield of 0.77 weight percent.

A sample of the catalyst of the present invention prepared as described in Example I was steamed at 1450° F. for 12 hours after calcination and subsequently tested in a MAT-type test procedure to convert 65 weight percent of the gas oil feedstock to hydrocarbons boiling below 450° F. with a corresponding coke yield of 0.55 weight percent. The results of these tests are summarized in Table II.

TABLE II

| | SUMMARY OF RESULTS | |
|---|---|---|
| Catalyst | Conversion, Weight Percent | Coke Yield, Weight Percent |
| B | 65 | 0.77 |
| Catalyst of the Present Invention | 65 | 0.55 |

The hereinabove described parallel comparison clearly demonstrates that the catalyst containing dealuminated stabilized Y zeolite (Linde LZ-20) generated 28.6 percent less coke than the catalyst containing conventional Y zeolite (Linde LZ-Y82) which is considered to be a surprising and unexpected result.

EXAMPLE III

This example is presented to demonstrate the undesirability of utilizing alumina or alumina in admixture with a dealuminated zeolitic aluminosilicate in the fluid catalytic cracking of hydrocarbons.

A high grade alumina powder was steamed at 1425° F. for 12 hours, subsequently tested according to the standardized MAT test conditions and found to convert 5 weight percent of the gas oil feedstock to hydrocarbons boiling below 450° F. with a corresponding coke yield of 0.9 weight percent of the feedstock. This illustrates that alumina by itself gives totally unacceptable hydrocarbon conversion while at the same time yielding a very high coke yield.

An alumina slurry was prepared by precipitating an aqueous aluminum nitrate solution with dilute ammonia. The resulting alumina was washed and slurried with a finely divided dealuminated stabilized Y zeolite (LZ-20). The slurry was decanted and the solids were dried at a temperature of 180° F. The dried material, which contained 30 weight percent zeolite, was ground to a powder having −30 +100 mesh and subsequently calcined for one hour at 1300° F. Prior to the admixture, the dealuminated stabilized Y zeolite was rare earth exchanged and the rare earth metal component was present in an amount of about 3.7 weight percent based on the metal exchanged zeolite. A sample of this resulting catalyst was steamed at 1450° F. for 12 hours, subsequently tested according to the standardized MAT test conditions and found to convert 56.4 weight percent of the gas oil feedstock to hydrocarbons boiling below 450° F. with a corresponding coke yield of 1.2 weight percent of the feedstock. Another fresh sample of this catalyst was steamed at 1350° F. for 12 hours, subsequently tested according to the standardized MAT test conditions and found to convert 59.6 weight percent of the gas oil feedstock to hydrocarbons boiling below 450° F. with a corresponding coke yield of 1.1 weight percent of the feedstock. The results of these tests along with the results from a catalyst of the present invention as described and tested in Example I are presented and summarized in Table III.

TABLE III

| | SUMMARY OF RESULTS | |
|---|---|---|
| Catalyst | Conversion, Weight Percent | Coke Yield Weight Percent |
| Alumina | 5 | 0.9 |
| Alumina - Dealuminated Stabilized Y Zeolite (30% Zeolite) (1450° F./ 1350° F.) | 56.4/59.6 | 1.2/1.1 |
| Silica - Dealuminated Stabilized Y Zeolite (30% Zeolite) (1425° F.) | 59 | 0.4 |

This summary clearly demonstrates that when alumina is substituted for silica and the resulting dealuminated stabilized Y zeolite catalysts are steam calcined at comparable temperatures (1425° F. for silica and 1450° F. for alumina) and tested at the standardized MAT conditions, the silica containing catalyst utilized in the present invention had a greater conversion by 2.6 weight percent while simultaneously producing only one third of the coke. In the comparison case, where the alumina containing dealuminated stabilized Y zeolite was steam calcined at 1350° F., the silica containing catalyst utilized in the present invention had essentially the same conversion while producing only about 0.36 of the coke.

Although U.S. Pat. No. 3,531,397 (Michalko) teaches that crystalline aluminosilicates in general may be dispersed in a silica matrix, this patent does not teach or exemplify the incorporation of a dealuminated stabilized Y zeolite in a silica matrix nor does the patent suggest that a particular aluminosilicate, in this case dealuminated stabilized Y zeolite, in combination with a silica matrix and a rare earth metal component would demonstrate a remarkable and unexpected ability for hydrocarbon conversion in a fluid catalytic cracking process.

Canadian Pat. No. 1,131,195 (Earls) claims a composition of matter (UHP-Y) which is herein referred to as dealuminated stabilized Y zeolite. The '195 patent also claims the method of preparing this zeolite. The only use or utility disclosed or taught by the '195 patent is the suitability of the zeolite to preferentially adsorb organic constituents from solutions or mixtures thereof with water. Furthermore, the '195 patent does not disclose or teach the use of dealuminated stabilized Y zeolite for any hydrocarbon conversion process and, in particular, for fluid catalytic cracking.

U.S. Pat. No. 4,401,556 (Bezman et al.) teaches the use of a dealuminated stabilized Y zeolite in combination with a diluent, such as silica, and a hydrogenation component in a middle distillate hydrocracking process. The '556 patent does not disclose, teach or suggest the use of a catalyst comprising dealuminated stabilized Y zeolite in any other type of process.

U.S. Pat. No. 4,259,212 (Gladrow et al.) discloses a cracking catalyst which comprises alumina, a porous oxide matrix such as silica and ultra-stable Y zeolite which may arguably be UHP-Y or dealuminated stabilized Y zeolite. The '212 patent does not teach or disclose a process for fluid catalytic cracking of a hydrocarbon oil which comprises contacting the oil at fluid catalytic cracking conditions with a catalyst consisting essentially of silica, a rare earth metal component and a zeolitic aluminosilicate having a SiO2/Al2O3 molar ratio of from 4.5 to 35, the essential X-ray powder diffraction pattern of zeolite Y, an ion exchange capacity of not greater than 0.070, a unit cell dimension $a_o$ of from 24.20 to 24.45 A, a surface area of at least 350 m$^2$/g (B-E-T), a sorptive capacity for water vapor at 25° C. and a $p/p_o$ value of 0.10 of less than 4.00 weight percent and a Residual Butanol Test value of not more than 0.40 weight percent. I have discovered that the catalyst utilized in my invention does not require the presence, incorporation or dispersion of discrete particles of alumina as taught in the '212 patent. In fact, the catalyst utilized in my invention demonstrates surprising and unexpected characteristics without the use of discrete alumina particles. Furthermore, the economic considerations of using alumina instead of silica may in some instances, at least, be unfavorable. The '212 patent also teaches that in the patentees' preferred embodiment, the zeolitic component will be substantially free of rare earth metals which is defined as a rare earth metal content of the zeolite of less than about 1 weight percent as metal oxide based on the weight of the metal exchanged zeolite. I have found that it is essential for the catalyst used in my invention to preferably contain a rare earth metal component in an amount from 1.0 weight percent to about 10 weight percent and more preferably from about 2 weight percent to about 5 weight percent based on the metal exchanged zeolite.

In summary, the hereinabove discussed patents do not teach, disclose or claim the fluid catalytic cracking process of the present invention which utilizes a catalyst consisting essentially of silica, a rare earth metal component and a dealuminated stabilized Y zeolite. Furthermore, these patents do not suggest the combination of their teachings to arrive at the present invention which has demonstrated such surprising and unexpected results as shown in the hereinabove presented examples.

The foregoing description and examples clearly illustrate the improvements encompassed by the present invention and the benefits to be afforded with the use of the process of the present invention.

I CLAIM AS MY INVENTION:

1. A process for fluid catalytic cracking of a hydrocarbon oil which comprises contacting said oil at fluid catalytic cracking conditions with a catalyst consisting of silica, a rare earth metal component and a dealuminated zeolitic aluminosilicate having a SiO2/Al2O3 molar ratio of from 4.5 to 35, the essential X-ray powder diffraction pattern of zeolite Y, an ion exchange capacity of not greater than 0.070, a unit cell dimension $a_o$ of from 24.20 to 24.45 A, a surface area of at least 350 m$^2$/g (B-E-T), a sorptive capacity for water vapor at 25° C. and a $p/p_o$ value of 0.10 of less than 4.00 weight percent and a Residual Butanol Test value of not more than 0.40 weight percent.

2. The process of claim 1 wherein said silica is present in an amount from about 5 weight percent to about 95 weight percent.

3. The process of claim 1 wherein said dealuminated zeolitic aluminosilicate is present in an amount from about 5 weight percent to about 95 weight percent.

4. The process of claim 1 wherein said rare earth metal component is present in an amount from 1.0 weight percent to about 10 weight percent based on the metal exchanged zeolite.

5. The process of claim 1 wherein said fluid catalytic cracking conditions include a temperature from about 800° F. to about 1100° F., a pressure from about 5 psig to about 150 psig, a catalyst to oil ratio from about 1 to about 10, a weight hourly space velocity from about 1 to about 50 and a residence time from about 0.5 second to about 1 minute.

* * * * *